United States Patent [19]

Gilbert

[11] Patent Number: 5,020,614
[45] Date of Patent: Jun. 4, 1991

[54] TRACTION SYSTEM

[76] Inventor: Lloyd Gilbert, 4865 S. Ravenna Rd., Ravenna, Mich. 49451

[21] Appl. No.: 354,850

[22] Filed: May 22, 1989

[51] Int. Cl.$^5$ .......................................... B62D 65/104
[52] U.S. Cl. ................................... 180/9.21; 180/9.5; 180/9.64; 305/27; 305/30
[58] Field of Search ...................... 180/9.1, 9.21, 9.46, 180/9.48, 9.5, 9.56, 9.64; 305/22, 24, 27, 30, 31, 28

[56] References Cited

U.S. PATENT DOCUMENTS

| | | | |
|---|---|---|---|
| 949,354 | 2/1910 | Désy | 305/28 |
| 1,683,407 | 9/1928 | Penn | 305/22 |
| 4,222,453 | 9/1980 | Fixsen et al. | 305/24 X |
| 4,402,555 | 9/1983 | Ogaki et al. | 305/24 X |
| 4,699,229 | 10/1987 | Hirose et al. | 305/24 X |
| 4,826,260 | 5/1989 | Plourde | 305/24 X |

Primary Examiner—Charles A. Marmor
Assistant Examiner—Mitchell Bompey
Attorney, Agent, or Firm—Waters, Morse & Harrington

[57] ABSTRACT

A vehicle having drive wheels subject to significant vertical movement is equipped with an endless track system that includes rollers mounted on the main frame ahead of the drive wheels, and track belts extending around the rollers and the main drive wheels. The roller axis is considerably displaced from the pivot axis of the beams carrying the drive wheels, and means are provided for accommodating the variations in distance between the pivot axes as the drive wheels change position vertically with respect to the main frame.

6 Claims, 4 Drawing Sheets

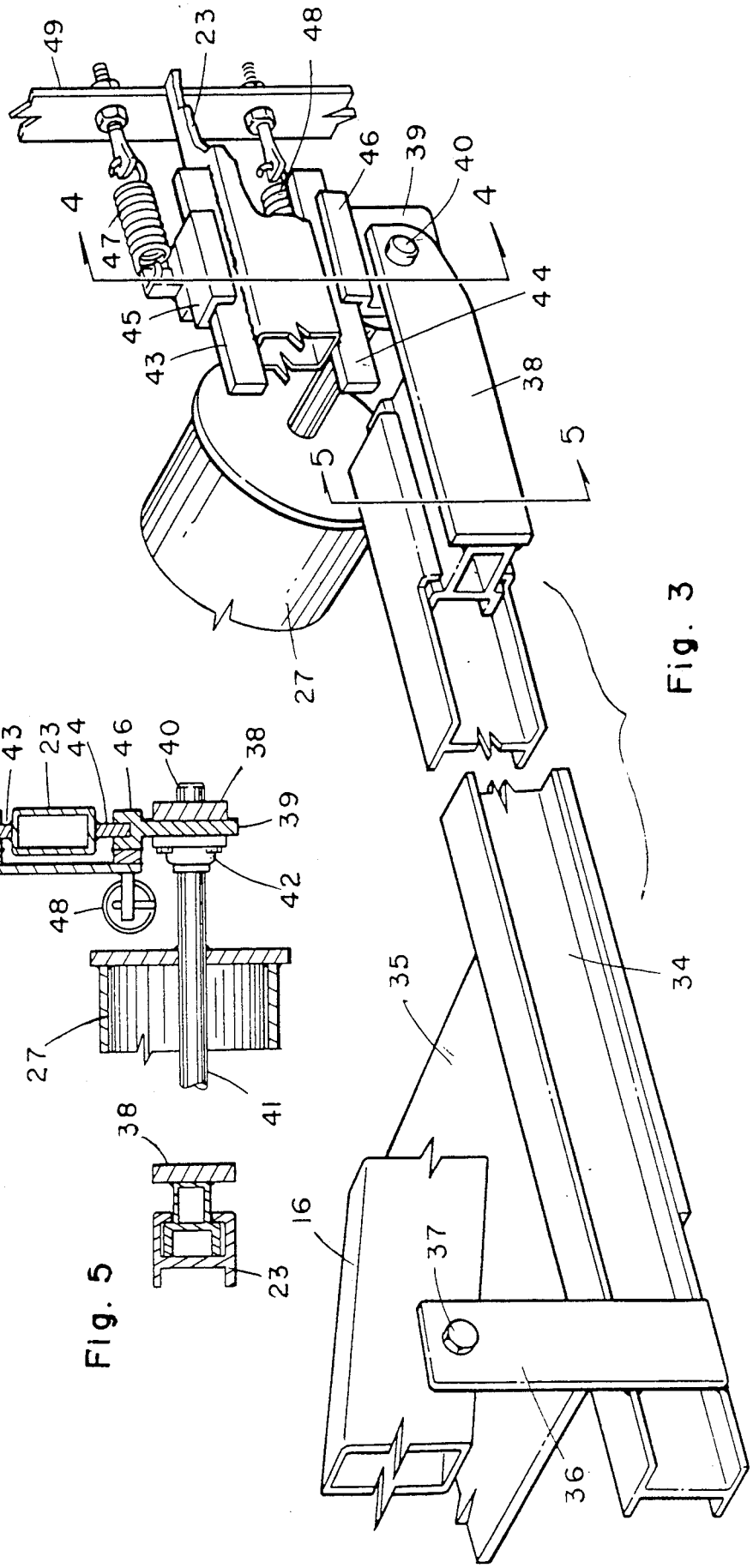

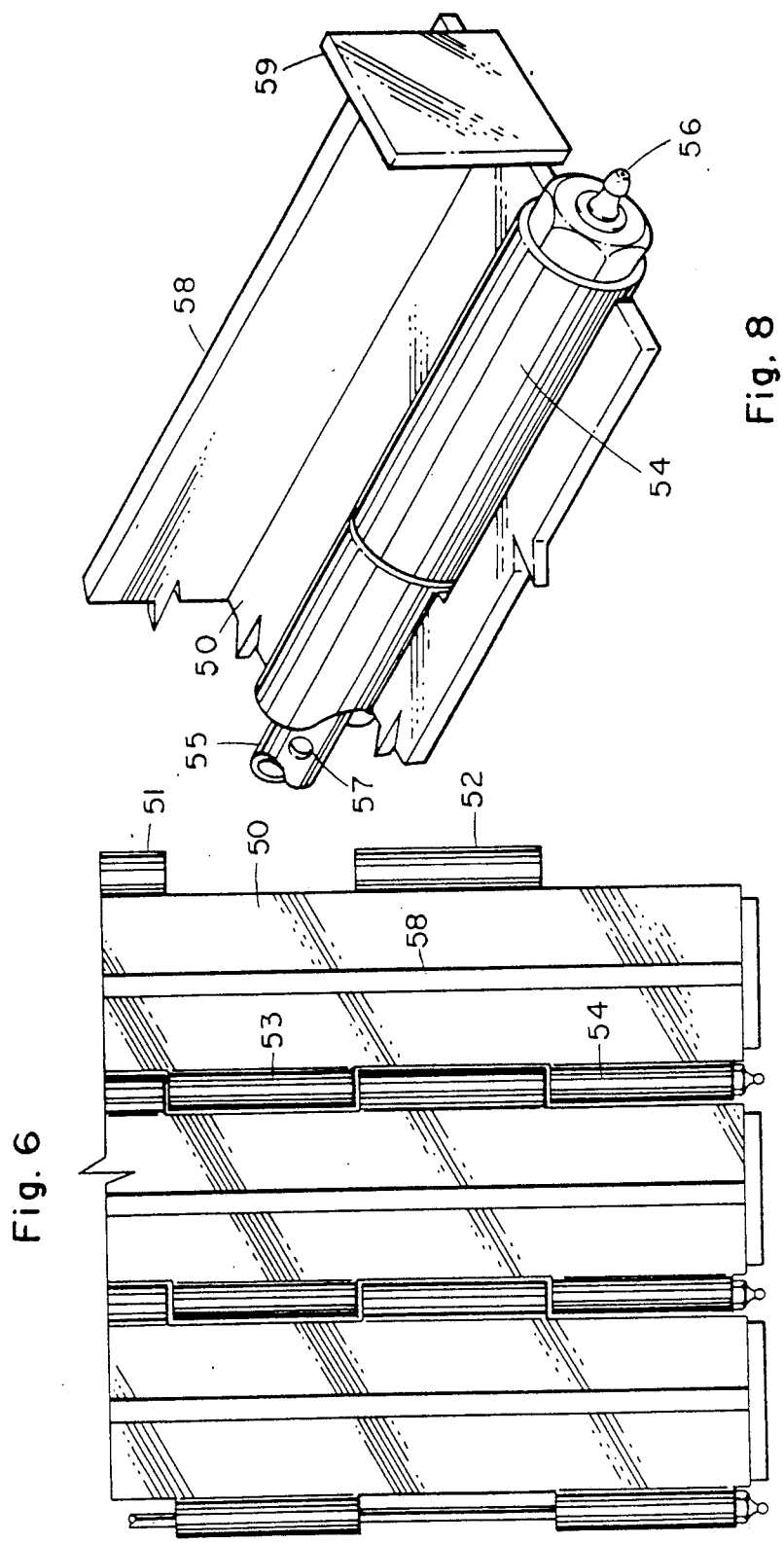
Fig. 6
Fig. 8
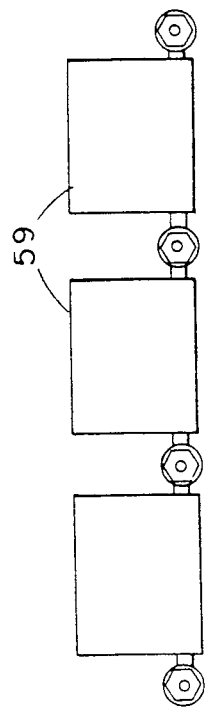
Fig. 7

TRACTION SYSTEM

BACKGROUND OF THE INVENTION

Agricultural equipment frequently must operate on soft ground, often on ground with the plastic characteristics of muck. The lighter equipment, such as small tractors, can usually provide sufficient floatation by the use of large tires, but these are inadequate for the heavier machines. Large blueberry-picking machines are a good example of the problem. The ground they must operate on is typically soft, and the machines have to be large enough to straddle a fully developed blueberry bush. These machines usually have large drive wheels that are vertically movable under the action of hydraulic actuators to accommodate the picking mechanisms of the machines to bushes of various height.

The use of endless track systems to provide support and traction on soft ground has been well established. Providing this feature as an addition to a standard machine having drive wheels subject to a wide range of vertical movement has presented considerable design problems, as one end of the track mechanism moves with the drive wheels, and the other is mounted on the main frame. Resulting variations in the distances between the axes of rotation must be accommodated. The present invention is directed at providing a traction system that can be added to a standard machine with minor modifications and low cost.

SUMMARY OF THE INVENTION

This traction system is an addition to a standard machine having drive wheels mounted for vertical movement on beams pivotally secured to the main frame. The track system includes track-carrying rollers rotatively mounted on the main frame, and track belts extending around these rollers and around the main drive wheels. A track-support structure pivots coaxially with the rollers, and is positioned at the opposite end by the beams supporting the main drive wheels. These beams do not pivot coaxially with the rollers, and means are provided for accommodating the variations in distance between the pivot axes as the drive wheels move vertically.

DESCRIPTION OF THE DRAWINGS

FIG. 3 is a perspective view on an enlarged scale, showing the structure for supporting the traction belt.

FIG. 4 is a section on the plane 4—4 of FIG. 3.

FIG. 5 is a section on the plane 5—5 of FIG. 3.

FIG. 6 is a fragmentary plan view showing the details of the track belt.

FIG. 7 is a bottom view with respect to FIG. 6.

FIG. 8 is a perspective view on an enlarged scale showing the details of the traction belt.

DESCRIPTION OF THE PREFERRED EMBODIMENT

Figure 1:
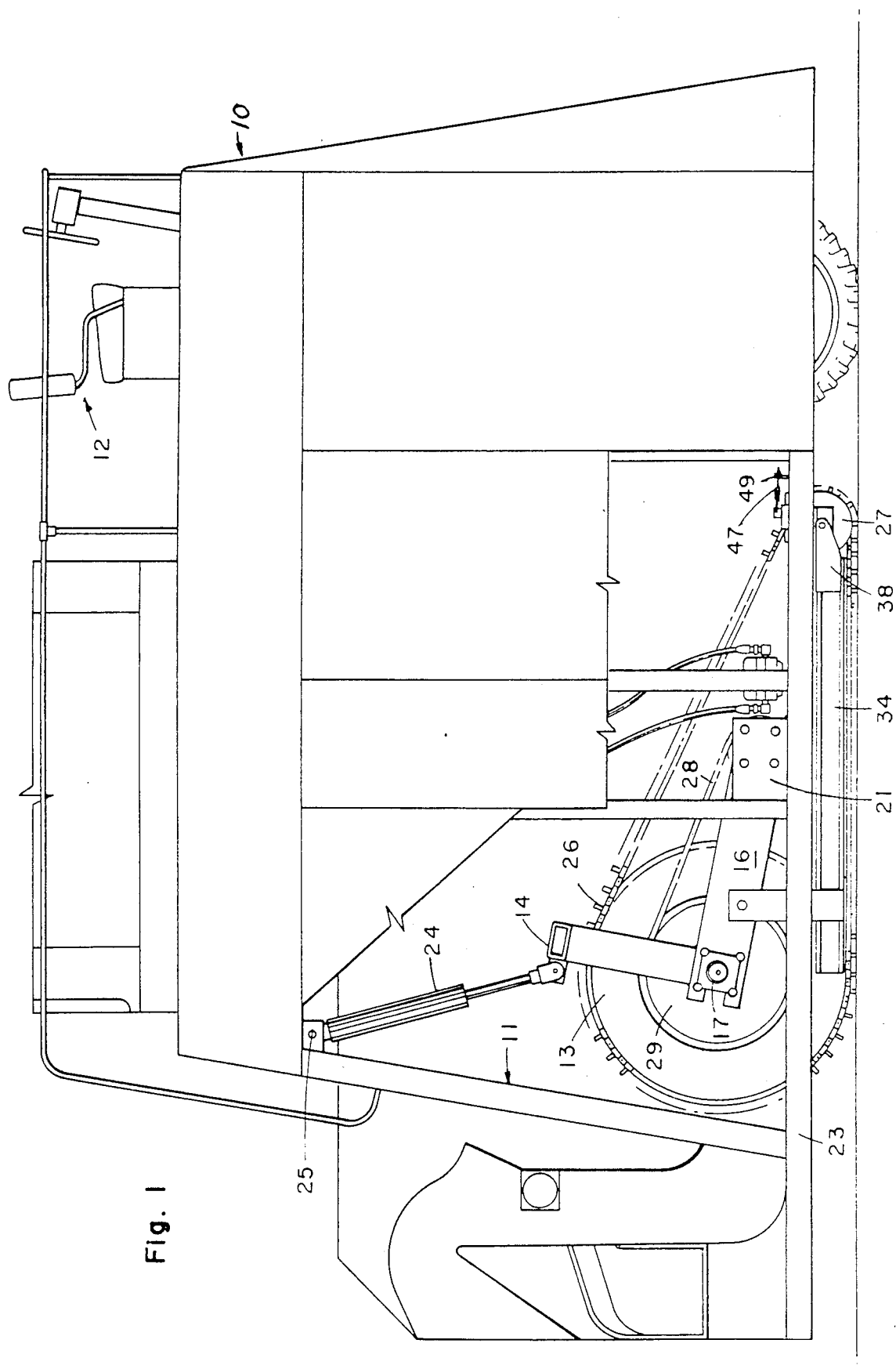
FIG. 1 is a side elevation of a machine embodying the present invention, with portions of the side panels of the body structure removed to expose the interior mechanism.
Figure 2:
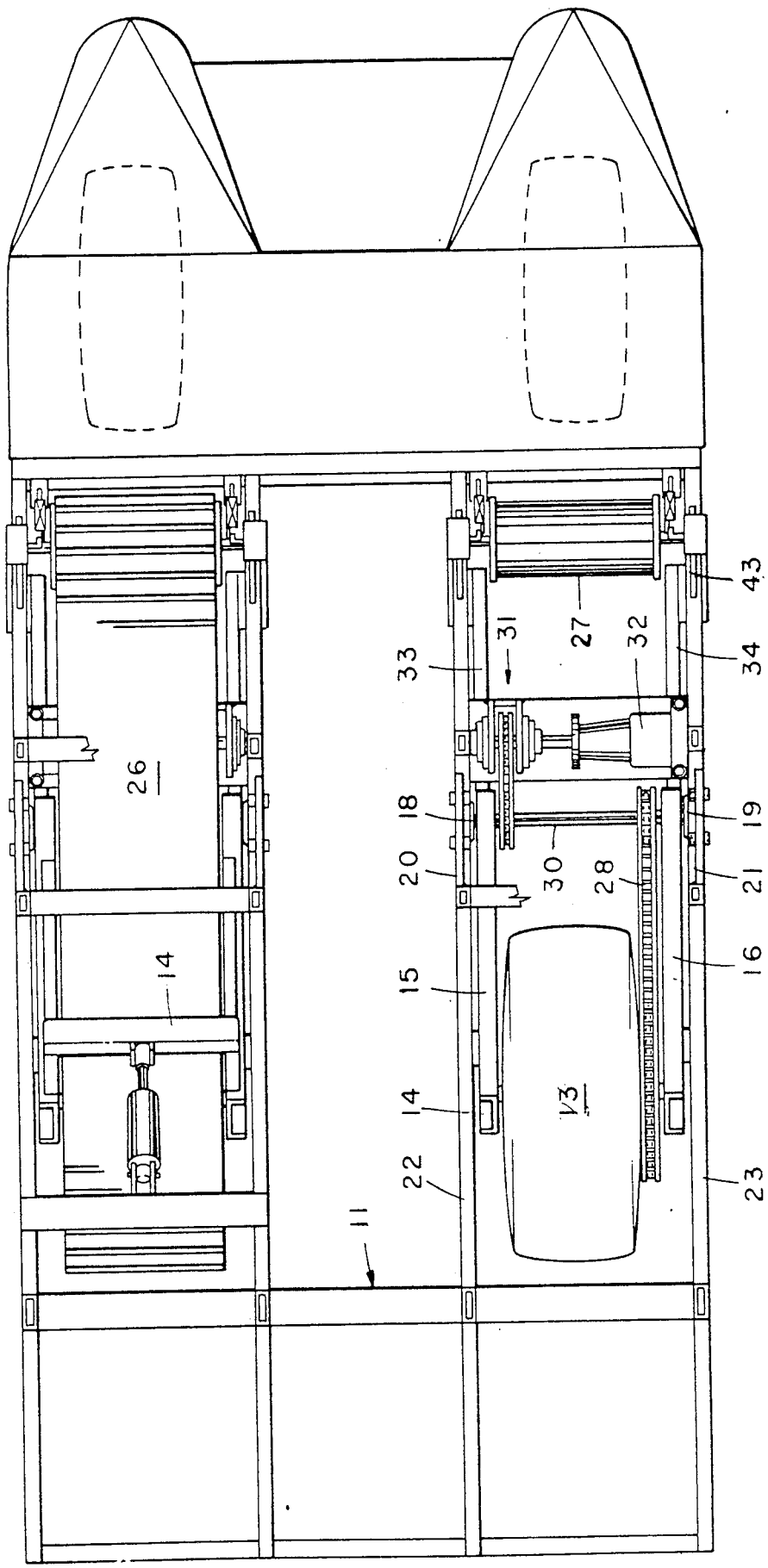
FIG. 2 is a section through the body structure of the machine, taken on a horizontal plane above the level of the drive wheels. The upper portion of FIG. 2 shows the traction belt in place, and the lower portion has the traction belt removed for clarity of presentation of the mechanism.

Referring to the drawings, the blueberry harvesting machine illustrated in FIGS. 1 and 2 includes a body structure generally indicated at 10 forming an enclosure for the harvesting machinery (not shown) in the central area of the machine, and also enclosing the drive system. The drive system is duplicated on the opposite sides of the machine. The body of the machine is of conventional construction, and includes a main frame 11 to which appropriate enclosure panels are secured around the outer periphery. An operator's station is indicated at 12, from which the machine is to be controlled. As viewed in FIGS. 1 and 2, the normal path of movement of the machine is from left to right.

On each side of the machine, the drive wheels indicated at 13 are each supported by a sub-frame which includes a U-shaped beam 14 with the radius arms 15 and 16 securely welded to the lower extremities. Bearings as shown at 17 in FIG. 1 are mounted at the rear ends of the radius arms for rotatively supporting the drive wheels 13. Bearings as shown at 18 and 19 are secured to plates 20 and 21, respectively, which are securely welded to the main frame members 22 and 23. This structure provides pivotal support for the sub-frame carrying the drive wheels. Vertical movement of the drive wheels is controlled by the hydraulic actuators 24 acting between the top of the U-beam 14 and pivot brackets as shown at 25 in FIG. 1, which are also secured to the main frame.

The endless flexible tracks 26 extend around the drive wheels, and around positioning rollers 27. The tracks are moved by the drive wheels 13, which receive power through the chains 28 and the driven sprockets 29. The chains receive power via sprockets at the opposite ends of the idler shaft 30, which rotates in bearings coaxially with the pivot axis of the sub-frame supporting the drive wheels. For simplicity, this frame may actually be pivoted on the idler shaft 30. The idler shaft receives power from the chain drive system indicated generally at 31 operated by the hydraulic motor 32.

The structure supporting the lower courses of the belts 26 includes the spaced side beams 33 and 34 interconnected by the support panel 35 (see FIG. 3) on which the lower courses of the tracks ride as they carry the weight of the machine on soft ground. This weight is transferred to the sub frame supporting the main drive wheels by the load-transfer members 36, pivotally connected to the radius arms 15 and 16 as shown at 37. Since vertical movement of the drive wheels involves pivoting of the wheel-supporting frame about the axis of the shaft 30, which is considerably displaced from the axis of the rollers 27, the system must accommodate the resulting variations in axial distance. These changes are accommodated by the telescoping relationship between the stub beams 38 and the side beams 33 and 34. The stub beams are pivotally mounted on the brackets 39, as shown at 40 in FIG. 3, where the shafts 41 emerge from the bracket 39. The shafts 41 of the rollers 27 are carried by the bearings 42 secured to the brackets 39 at both ends of the rollers, and belt tension is controlled by slidably mounting the brackets 39 with respect to the frame of the machine. The short rails 43 and 44 are welded to the top and bottom of the main frame members 22 and 23, and these are embraced by the slide members 45 and 46 of the bracket 39. A pair of tension springs 47 and 48 provides a balance of forces biasing the roller 27 forward, as the springs are adjustably secured to the terminal plate 49 mounted on the main frame. This structure is only partially shown in FIG. 2, because of the scale of this view.

Referring to FIGS. 6, 7, and 8, each of the articulated components of the traction belt includes a base plate 50 having the hinge elements 51 and 52 along one side, and 53-54 on the other. Tubular hinge pins 55 interconnect adjacent components, and it is preferable to include grease fittings as shown at 56 through which lubricant is delivered to the sections having relative movement through perforations in the hinge pin 55 as shown at 57. Cleat plates 58 are preferably welded to the base plates 50, and end plates as shown at 59 are welded across the ends of the cleat and base plates to inhibit the inflow of material as the machine moves across soft ground. The inside surfaces of the base plates 50 may slide directly on the support plate 35, or a covering plate (not shown) of low-friction material may be interposed between the belt and the support plate 35. Material such as nylon has been used experimentally, as well as slabs of hard wood. The latter can be treated so that it is somewhat impregnated with a lubricating compound.

I claim:

1. In combination with a vehicle having a frame and at least one wheel supporting member mounted for vertical movement with respect to said frame, and having a drive wheel mounted on said wheel-supporting, an endless track system comprising:
    a positioning roller rotatably mounted on said frame for rotation on an axis parallel to the axis of said drive wheel;
    endless track means engaging the periphery of said drive wheel and said roller providing an upper and a lower course for said endless track means;
    track-supporting means disposed above said lower course and mounted on said frame for vertical movement with respect thereto;
    load-transfer means interconnecting said wheel-supporting member and said track-supporting means for inducing vertical movement of said track-supporting means in response to a corresponding direction of movement of said wheel-supporting member; and
    a bracket slidably mounted on said frame, said bracket having bearing means supporting said roller, said track-supporting means also being pivotally supported by said bearing means.

2. A combination as defined in claim 1, wherein said wheel-supporting member and said track-supporting means are pivotally mounted on said frame.

3. A combination as defined in claim 1, wherein said track-supporting means is pivotally mounted on said frame, and further including means accommodating small changes in the distance between the axis of said drive wheel and the axis of pivotal mounting of said track supporting means induced by vertical movement of said drive wheel.

4. A combination as defined in claim 1, wherein said wheel-supporting member is pivotally mounted on said frame, and said load-transfer means is a member pivotally connected to at least one of said wheel-supporting member and said track-supporting means.

5. A combination as defined in claim 4, wherein said track-supporting means has a limited freedom of movement in a direction of the distance between the axes of said drive wheel and of the pivotal mounting of said track-supporting means, and said load-transfer means is a member fixed with respect to said track-supporting means.

6. A combination as defined in claim 1, wherein said positioning roller is mounted in bearing means secured to said frame with limited freedom of movement in a direction of the distance between the axes of said drive wheel and of said roller.

* * * * *